Figure 3:
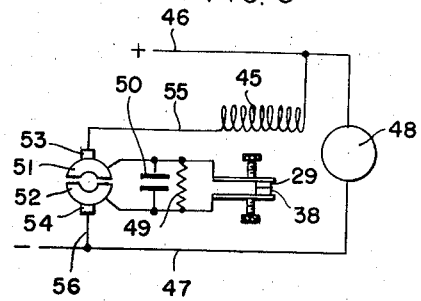

March 3, 1959  A. E. SCHWANEKE ET AL  2,876,215
SPEED GOVERNOR
Filed Jan. 7, 1957  2 Sheets-Sheet 1
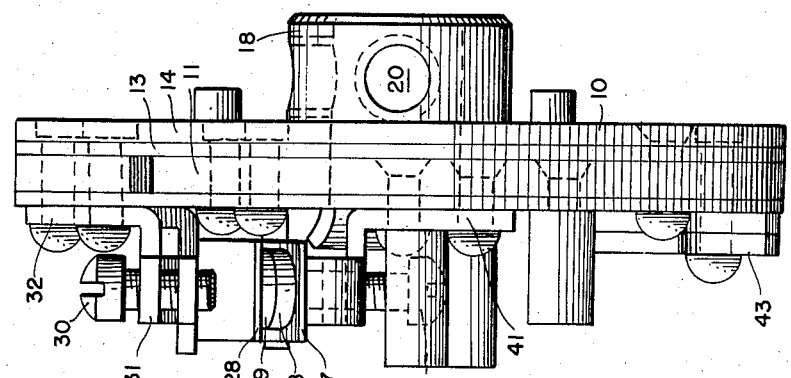
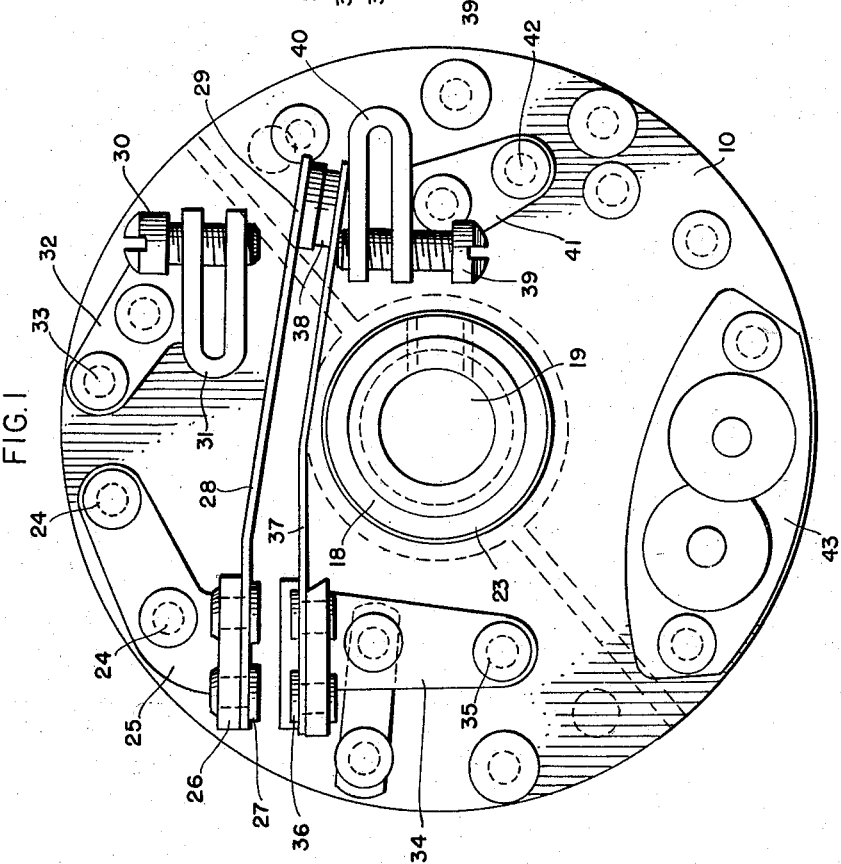
INVENTOR.
HERMAN P. RANDICK
ALFRED E. SCHWANEKE
BY
ATT'Y March 3, 1959    A. E. SCHWANEKE ET AL    2,876,215
SPEED GOVERNOR Filed Jan. 7, 1957    2 Sheets-Sheet 2

INVENTOR.
HERMAN P. RANDICK
ALFRED E. SCHWANEKE
BY
ATT'Y

United States Patent Office 2,876,215
Patented Mar. 3, 1959

2,876,215

SPEED GOVERNOR

Alfred E. Schwaneke, Northbrook, and Herman P. Randick, Chicago, Ill., assignors to A-M Company, Chicago, Ill., a partnership Application January 7, 1957, Serial No. 632,731

5 Claims. (Cl. 200—80)

This invention relates to a governor device useful in controlling the rotational velocity of electric motors, generators and the like, and it is more particularly concerned with a temperature insensitive centrifugal governor wherein the governor element responsive to centrifugal force has a constant modulus of elasticity or constant coefficient of stiffness, with the result that its control reaction depends upon rotational velocity alone and is uninfluenced by environmental temperatures.

There are many applications for the use of electric motors and similar devices wherein it is essential that the rotational velocity thereof be closely controlled so that there is substantially no variation from a predetermined frequency or velocity of rotation. In order to provide accurate speed control, governors have been employed which function to maintain the motor rotation at a predetermined value. Customarily, such governors are centrifugally actuated, and when the motor speed tends to increase above a predetermined value, the resultant increase in the centrifugal force acting on the governor control element tends to move it outwardly so as to make or break an electric contact, as the case may be, changing the character of the electric circuit and returning the motor to its original rotational velocity.

Unfortunately, it is found that where close regulation of this type is required, there may be substantial changes in the environmental temperatures in which the motor functions. For example, a motor may be used in an airplane or other aircraft wherein the ambient temperatures may be quite high when the aircraft is on the ground, but drop substantially below zero as the aircraft attains high altitudes. Temperature changes of this character influence and seriously affect the operation of a conventional centrifugal governor because the resistance of the control element to centrifugal force changes sharply with a change in temperature. In this respect, ordinary metal alloys become elastically weaker as temperature increases due to their negative temperature coefficient of modulus, and they also increase all of their dimensions due to a positive coefficient of expansion. Thus, as temperature increases, the increased dimensions of a metal tend to make it elastically stronger, while at the same time the change in the modulus of elasticity tends to make it weaker. As a result, conventional centrifugal governors of a simple character become unreliable as a means for accurately controlling the velocity of a motor that operates in changing ambient temperatures.

To overcome this difficulty, the practice in the past has been to form the governor responsive element of bi-metal which is intended to maintain the physical properties of the element relatively constant independently of the environmental temperature. Though bi-metallic elements of this type have provided an improvement over the simple centrifugal governor, they too are ineffective to maintain accurate control over the velocity of a motor. There are several reasons for this, and among these are the dimensional change and change in the modulus of elasticity mentioned above, although such effects are not so pronounced with a bi-metal element. In addition, mechanical hysteresis influences the behavior of such elements (that is, if the element is loaded to a stress less than the proportional limit and then quickly unloaded, as is the case when the element is performing its control function, the deflection during unloading will be greater than the deflection at any corresponding point along the deflection curves during loading), and introduces inaccuracies that are difficult to compensate. Moreover, repetitious loading and unloading of the response element causes drift or creep which also introduces inaccuracies.

A further error that we have recognized is that a temperature differential exists from end to end of the control element for it is in the nature of an elongated leaf, mechanically connected at one end to a plate or support to make it rigid therewith and is otherwise free so that it can deflect under the influence of centrifugal force. Because of this, the heat developed by a motor during its operation is carried by the heat-conductive metals to the rigidly supported end of the response element, and that end of necessity has a higher temperature than the rest of the element. Thus, the bi-metallic element provides a distorted deflection response from end to end thereof because of the incrementally decreasing temperature from its supported to its free end. This introduces further errors and inaccuracies in the control response thereof.

It is evident that an improved centrifugal governor for motors and generators and the like is needed in the art, and it is accordingly an object of this invention to provide the same. Another object of the invention is to provide a centrifugally actuated governor for controlling the rotational velocity of electric motors and the like, which is substantially insensitive to temperature change and functions to provide accurate control even though the ambient or environmental temperatures vary through an extended range. Still another object is in the provision of a governor of the character described, wherein the control element which is deflected by the action of centrifugal force thereon has a constant modulus of elasticity irrespective of temperature change, whereby its control reaction depends upon rotational velocity alone and not upon environmental temperature conditions.

Yet a further object is that of providing a governor of the type described which overcomes a number of the phenomena discussed above which introduce errors into the accuracy with which known centrifugal governors can control the operational velocity of electric motors and the like. Yet a further object of the invention is to provide a governor having a support member adapted to be rotatably driven and a pair of contacts supported thereon, one of which has a predetermined position with respect to the support member and the other of which is carried adjacent an end of a control or deflection member rigidly anchored at its other end to the support and which is deflectible under the influence of centrifugal force to establish a predetermined relation between the contacts at a preselected rotational velocity of a motor—such relationship being accurately established even though temperature differentials exist from end to end of the deflectible response member. Additional objects and advantages will become apparent as the specification develops.

An illustrative embodiment of the invention is shown in the drawings, in which—

Figure 4:
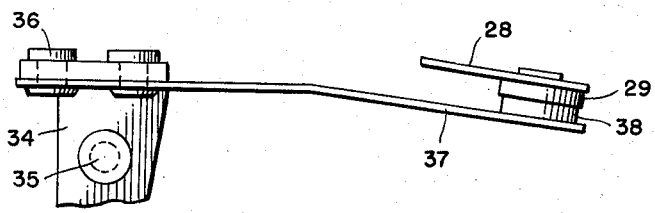

Figure 1 is an end view in elevation of a governor embodying the invention; Figure 2 is a side view in elevation of the device illustrated in Figure 1; Figure 3 is a schematic circuit diagram of the governor device in its relation to a motor circuit; Figure 4 is an enlarged broken side view in elevation particularly of the response element; and Figure 5 is an enlarged broken longitudinal sectional view of a portion of the device.

Figure 5:
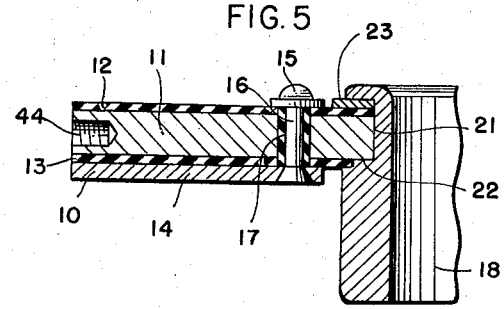

The embodiment of the invention shown in the drawings comprises an annular support member or disc 10 which, as is shown best in Figure 5, has a central metal core 11 covered on each side thereof with insulation sheets 12 and 13, respectively. Disposed below the insulation sheet 13 is a backing plate 14, and all of these members are secured together in the contiguous relation illustrated by rivets 15 that, if desired, may have the shanks 16 thereof enclosed in an insulating sheath 17. Centrally, the support 10 has an enlarged opening therethrough.

Positioned within the central opening in the support member 10 is a hub 18 having a bore 19 extending therethrough adapted to receive the shaft of a motor therein. The hub is rigidly secured to such a motor shaft so as to prevent relative rotation therebetween by means of a set screw (not shown) adapted to be threadedly received within a threaded aperture 20 in the hub. The hub may be rigidly secured to the support member 10 by any suitable means, and for this purpose (as shown in Figure 5) one end 21 of the hub may be reduced in diameter so as to be received within the central opening in the support member so that such support member rests upon a shoulder 22 that forms the connection between the restricted end 21 and enlarged portion of the hub. A portion of the reduced end 21 of the hub extends through the support disc and may be swaged outwardly to constrain the support against the shoulder 22. If desired, a reinforcing ring 23 may be interposed between the upper sheet 12 of insulation and the swaged end of the hub.

Referring now to Figure 1, it will be seen that the support 10 has rigidly mounted thereon by means of rivets 24, a bracket 25 of generally L-shaped configuration—the upwardly extending leg 26 thereof having secured thereto by rivets 27, a centrifugally deflectible element 28 in the form of an elongated leaf having a contact 29 secured to the free end thereof. The element 28 extends chordally across the support disc 10 so that when the disc is rotated, centrifugal force will cause the element 28 to deflect outwardly and against an adjustable stop 30 threadedly carried by the U-shaped legs 31 of a mounting bracket 32 rigidly secured to the support disc 10 by rivets 33. The U-shaped legs 31 serve as a locking means to anchor the adjustable stop 30, which is in the form of a threaded screw, at any selected position.

Also rigidly secured to the support disc 10 is a bracket 34 of generally L-shape. The base leg is made rigid with the planar surface of the disc by means of rivets 35, and the outwardly extending leg thereof has mounted thereon by means of rivets 36, a deflection member or control member 37 in the general form of an elongated leaf carrying at its free end a contact 38. The control member 37 extends chordally across the support 10 in generally parallel relation with the deflection element 28 so that in the position of the parts shown, the contacts 29 and 38 are in engagement. In the configuration of parts illustrated in Figure 1, the support disc 19 is stationary and the initial position of the deflection control element 37 is determined by a stop 39 in the form of a set screw carried by the U-shaped legs 40 of a mounting bracket 41 rigidly secured to the support disc by rivets 42.

In order to dynamically balance the rotatable support disc 10, a counter-weight assembly 43 may be secured thereto generally opposite the brackets 25, 32, 34 and 41 and the components carried thereby. To further balance the disc, it may have a plurality of circumferentially spaced bores or passages 44 (Figure 5) therein adapted to threadedly receive set screws (not shown). Thus, by providing set screws where needed in the various threaded bores 44 and by adjusting their position axially with respect thereto, an accurate dynamic balance for the structure can be attained.

The contacts 29 and 38 are adapted to be connected in circuit with an electric motor, as illustrated schematically in Figure 3. It is there illustrated that the components 29 and 38 are connected in series with the field winding 45 across a power source designated by the leads 46 and 47. A motor rotor 48 is connected across the same power source in parallel relation with the serially connected winding 45 and contacts. The contacts 29 and 38 are shunted by a resistance 49 paralleled by a capacitance 50 so that when the contacts are open, current flows around the contacts through the resistance 49. If a D. C. motor is employed, collector rings 51 and 52 and brushes 53 and 54, in engagement respectively therewith, may be connected as shown—the rings 51 and 52 paralleling the resistor 49 and capacitor 50, and the brushes being connected respectively directly to one end of the winding 45 through lead 55, and directly to the power line 47 through lead 56.

The operation of the device is as follows after the hub 18 has been secured to the shaft of a motor and the contacts 29 and 38 connected in circuit therewith as described. Initially, the contacts 29 and 38 are closed so that a large current flows through the winding 45. When the support disc 10 attains a predetermined velocity, the deflection element 28 flexes outwardly because of the influence of centrifugal force thereon, and its amount of movement will depend upon the position of the stop 30. Therefore, at such preselected rotational velocity and through a predetermined range of velocities thereabove, the contacts 29 and 38 will be open and the resistance 49 will be in series with the winding 45, thereby limiting the current flow therethrough.

As the velocity of the support disc 10 continues to increase, a value is reached at which the control element 37 flexes outwardly under the influence of centrifugal force thereon to bring the contact 38 into engagement with the contact 29 to short out the resistance 49 and again connect the winding 45 directly across the power source. The control element 37 flexes in and out in accordance with changes in the velocity of the support disc 10 to open and close the contacts 29 and 38 and thereby maintain the velocity of the disc, and of course of the motor rotating the same, at a predetermined value.

It is apparent that the position of the contact 29 is positively determined with respect to the support disc 10 once that disc attains the lower predetermined velocity in its rotational cycle. The control element 37 then is the one that will tend to have its operation influenced by ambient or environmental temperatures. However, in the present invention the element 37 has a constant modulus of elasticity—that is, the modulus of elasticity remains the same irrespective of temperature changes. Further, the modulus of elasticity is the same for each incremental length of the deflection member from end to end thereof, even though there be a temperature differential between the ends. Thus, the only factor influencing the deflection thereof is the centrifugal force acting thereon whereby it moves outwardly to close the contacts 29 and 38 always at the same precise rotational velocity of the support disc, and that is independent of whatever the temperatures may be.

The modulus of elasticity of the deflectible control response member 37 can be made substantially constant—that is, substantially zero—by selecting the composition thereof. For example, it has been found that a deflection member having the following composition will have a modulus of elasticity that is substantially zero at least through the temperature range of −50° F. to +150° F., and this is the ordinary useful working range of temperatures encountered:

| Elements: | Amount, percent |
|---|---|
| Nickel | 42.0 |
| Chromium | 5.2 |
| Titanium | 2.4 |
| Chromium+titanium | 7.5 |
| Carbon | .03 |
| Manganese | .4 |
| Silicon | .4 |
| Aluminum | .4 |
| Sulfur | .04 |
| Phosphorus | .04 |
| Iron | Bal. |

The mechanical hysteresis of such a constant modulus material is unusually low, especially when it is age hardened in the solution-annealed condition. When twenty-five percent or more cold work is employed, the hysteresis error decreases to approximately 0.02%, but any cold working reduces mechanical hysteresis. Also, the error due to drift is low in this material. In tests that were made using a material having substantially the composition set forth in the table above, and wherein the material was solution-annealed and cold-worked but not age hardened, the following results were attained.

*Test I*

| +165° F. | −100° F. |
|---|---|
| 437 R. P. M. | 437 R. P. M. |
| 436 R. P. M. | 436 R. P. M. |

*Test II*

| +165° F. | +73° F. | −105° F. |
|---|---|---|
| 435.5 | 436.0 | 435.2 |
|  | 435.9 | 435.1 |
|  | 435.8 | 435.2 |

It will be apparent that the frequency or rotational velocity of an electric motor can be maintained at a substantially constant predetermined value regardless of temperature changes because of the unusually low drift and mechanical hysteresis, and because of the substantially zero temperature coefficient of modulus of the responsive element 37 of the governor control. Therefore, precision apparatus can be made independent of ordinary temperature fluctuations without the use of auxiliary and expensive temperature compensating equipment.

While in the foregoing specification an embodiment of the invention has been set forth in considerable detail for purposes of making a complete disclosure thereof, it will be apparent to those skilled in the art that numerous changes may be made in those details without departing from the spirit and principles of the invention.

We claim:

1. In a governor for controlling the rotational velocity of electric motors and the like, a support adapted to be rotated about a predetermined axis, a pair of contacts one of which is carried by said support in a predetermined relation with respect thereto, and a centrifugally responsive element secured to said support and oriented so as to be responsive to centrifugal force developed during rotation thereof, the other of said contacts being carried by said responsive element for selective engagement with the aforesaid one contact, said responsive element having a modulus of elasticity characterized by a substantially zero negative coefficient and comprising a cold-worked, solution-annealed alloy of predominantly nickel-iron composition.

2. In a centrifugally actuated governor adapted for use in controlling the rotational velocity of electric motors and the like and having a support adapted to be rotatably driven by such motor, a pair of contacts adapted to be opened and closed in response to changes in the velocity of the support from a predetermined value to maintain the velocity at that value, and a centrifugally actuated speed responsive element secured to said support and to one of said contacts, said responsive element having a modulus of elasticity that is substantially independent of temperature change and is therefore relatively constant throughout an extended temperature range, said responsive element comprising an alloy of predominantly nickel-iron composition age-hardened in a solution-annealed condition and cold-worked to greater than 25%.

3. In a centrifugally actuated governor adapted for use in controlling the speed of electric motors and the like by changing the relationship between a pair of contacts when the speed of such motor tends to exceed a predetermined value, a deflectible speed responsive element adapted to carry one of such contacts and to be mounted with respect to such motor so as to be influenced by centrifugal force, said element having a substantially constant modulus of elasticity characterized by a substantially zero thermal coefficient whereby the control response thereof depends upon the value of the centrifugal force acting thereon uninfluenced by ambient temperatures, said element being a nickel-iron composition additionally comprising titanium, manganese and aluminum and being solution-annealed, age-hardened and cold-worked.

4. The governor structure of claim 1 in which said responsive element is age-hardened in a solution-annealed condition.

5. The governor structure of claim 1 in which said responsive element is cold-worked to the amount of about 25%.

References Cited in the file of this patent

UNITED STATES PATENTS 2,767,272     Nader     Oct. 16, 1956